Aug. 14, 1934.  K. LANDEWEER  1,970,239

SHOCK ABSORBER FOR MOTOR VEHICLES AND THE LIKE

Filed April 30, 1931  2 Sheets-Sheet 1

Patented Aug. 14, 1934

1,970,239

UNITED STATES PATENT OFFICE 1,970,239

SHOCK ABSORBER FOR MOTOR VEHICLES AND THE LIKE

Klaas Landeweer, Utrecht, Netherlands

Application April 30, 1931, Serial No. 533,982
In the Netherlands January 21, 1931

5 Claims. (Cl. 267—11)

The object of shock absorbers for motor vehicles and the like is so to coact with the springs of the same that the body shall move upward and downward as little as possible when travelling over rough roads. Shock absorbers vary both in construction and in effect; those whose effect depends upon friction between members movable relatively to each other only absorb body movements directed upward or damp to an equal extent upward and downward movements; most shock absorbers are so constructed that they damp more strongly upwardly directed body movements than the downwardly directed movements which are also taken up by the springs.

Shock absorbers of various types are regulated according to the weight of the vehicle or the wishes of its purchaser; their effect upon body movements is usually satisfactory but may be inadequate in special cases, when curves are taken or high speed attained, for example. In the first case the body is undesirably tilted by the effect of centrifugal force and in the second case, if the shock absorbers have been adjusted for lower speeds, the upward and downward body movements are too great.

In regard to the tilting of the body in driving around curves, attempts have been made to obviate this disadvantage by connecting the body with the front and rear axles by means of crossed rods, arranged scissor fashion, which makes it almost impossible for the body to tilt. This arrangement results however in making body movements abrupt and stiff; further, the joint-pins are exposed to great friction and consequently to undue wear and rattling soon sets in.

The object of this invention is to obviate these inconveniences. To this end, shock absorbers are so constructed that their effect may be regulated whilst the vehicle is being driven, by means of a devices adapted to operate automatically, which is influenced by the movements of the vehicle and may, if desired, be adjusted by hand.

Although, as will be explained, the invention is applicable to friction shock absorbers, it is specially intended for use with hydraulic shock absorbers for these permit of easier variation of the braking effect. The braking effect may be varied automatically by the movements of the car by means, for instance, of a weighted pendulum actuated by gravity, momentum or centrifugal force, of a centrifugal governor connected with the drive, of a movably mounted member exposed to wind resistance or in various other ways.

In the accompanying drawings Fig. 1 shows diagrammatically an embodiment of a shock absorber whose action is automatically regulated by centrifugal force; Figs. 2, 3 and 4 show the application of the invention to a known hydraulic shock absorber.

The cylinders 1 and 2 of the shock absorber (Fig. 1) are affixed to the chassis or other suspended part of the vehicle and contain pistons 3, 4 having rods 5, 6 secured at their lower ends to one of the vehicle axles. Said cylinders are filled with a liquid, preferably oil, which can only escape through a small aperture 7 (8) when the cylinder moves upwards (or when the piston moves downwards) and which, during movement in the opposite direction, can moreover flow through a by-pass 9 (10) having a check-valve 11 (12), thereby braking differentially the movements of the pistons to the degree required. In principle, these parts may be considered to be known.

According to the present invention, the by-pass 9 (10) is arranged to comprise a normally open cock 13 (14), which may be closed to a greater or lesser degree or even entirely by means of an arm 15 (16).

In the case of an inclination of the chassis towards the axle, use is made of the upward motion of one of the chassis sides wholly or partly to close the by-pass on the opposite side. In such case, piston rods 5 (6) actuates a bell crank lever 41, 42 (43, 44) adapted to rock in a bearing about a pivot 45 (46). Said pivot is carried by a support 47 (48) fixed to a cylinder 1 (2). Arm 42 (44) of the bell crank lever is connected by a tensioning member, a Bowden cable 49 (50) for example, to the lever 16 (15) of cock 14 (13). It will be clear from the foregoing that, when cylinder 1 ascends, the descent of cylinder 2 is subjected to more than normal braking and vice versa. The disadvantage, that the effect required is mainly produced adjacent to the central position of pistons 3 and 4, may be obviated by providing a friction joint at the point of rotation 45 (46), for example, between the lever arms 41, 42 (43 44) which, in thise case, are not rigidly attached to each other. Hence, when piston 3 descends, arm 42, member 49 and lever 16 are always displaced towards the left and are displaced towards the right when said piston rises.

Fig. 2 is a view of two shock absorbers fitted to the left and right hand sides of the vehicle and Fig. 3 is a section through the right hand absorber.

Figure 1:
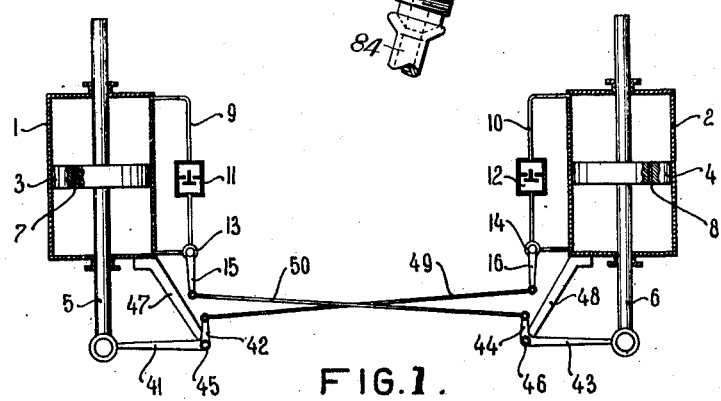

Each shock absorber comprises a housing 51 (52), closed by a lid 53 (54) and fitted to the chassis of the vehicle. The end of a shaft 55 (56), rotatably mounted in the housing and projecting from the same, carries a lever 57 (58) whose end is joined to one of the axles of the vehicle.

Each of said housings contains two cylinders 61 (62) (Fig. 3), enclosing each a movable piston 63 (64). Said piston only closes the lower portion of the cylinder, where it has a valve 65 (66), its upper end 67 (68) being in resilient engagement with a rocker 69 (70) fixed to shaft 56 and whose ends remain permanently in contact with both pistons.

A stem 71 having a narrow and shallow groove 72 fits closely in a bore through piston 63. In shock absorbers of normal design, a similar stem likewise passes through piston 63 but displays a groove of wider cross section. When the housing is filled with liquid, oil for instance, above the level of the piston, said liquid opposes a different resistance to each of the two pistons when these are depressed by the rocker, for the reason that said liquid can only escape upward through narrow grooves of different cross sections. The function of the grooves in the stems is similar to that of a narrow aperture in the piston (7, 8 Fig. 1). Owing to the interchangeability of the stems, the effect of the shock absorber may be regulated according to the weight of the vehicle and the wishes of the user.

Figure 3:
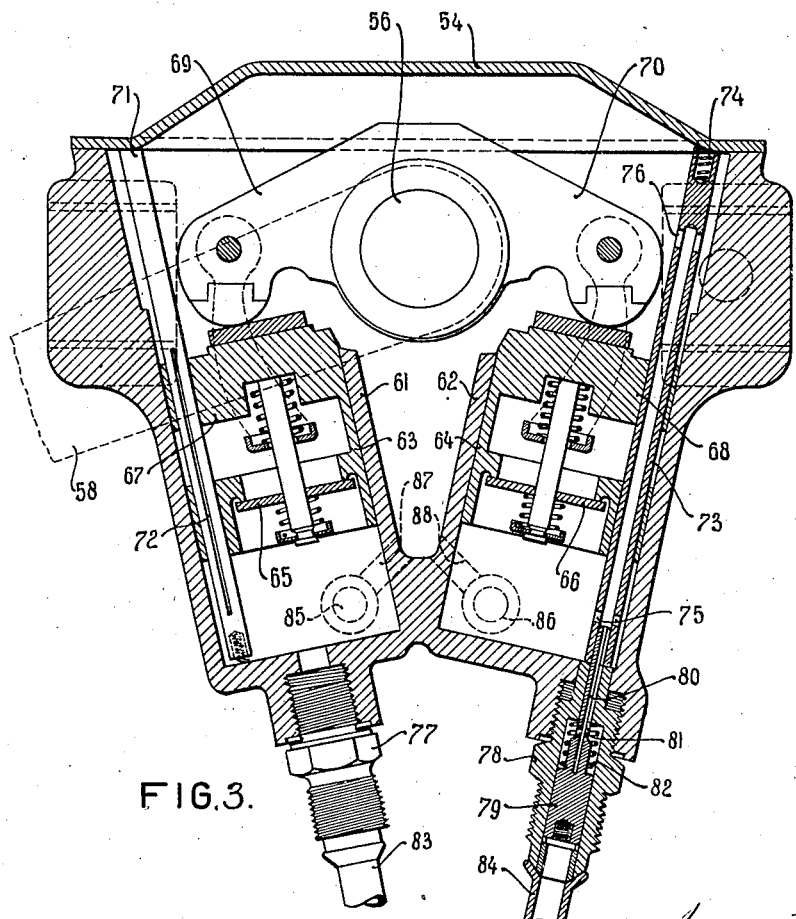

In Fig. 3, the grooved stem of piston 64 is a hollow stem 73 which is pressed against the cover of the cylinder by a spring 74 housed in the upper portion of the stem, said hollow stem having narrow openings 75 at its lower end and wider openings 76 at its upper end. The degree of resistance opposed to the oil by openings 75 is approximately equal to that which would be provided by a grooved stem fitted at this spot.

Screwed into the lower part of housing 52 are two nipples 77, 78 the first one opening into cylinder 61 and the second opening below hollow stem 73 and carrying a sliding member, whose lower end 79 is housed in the cylindrically bored nipple while its narrower upper end 80 enters stem 73.

Figure 2:
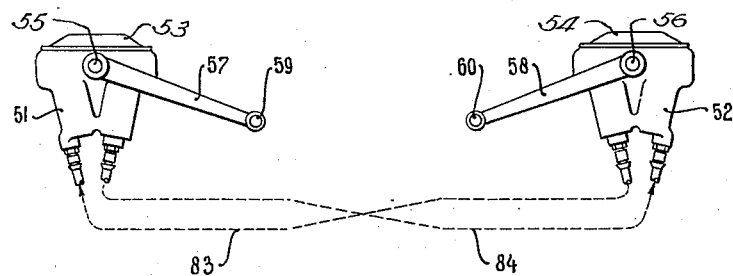
Figs. 2 and 3 show the application of the invention to a hydraulic shock absorber of well known type, in which use is made of the liquid pressure at one side to throttle or even to stop entirely the flow of liquid at the other side.

This portion of the sliding member is bored and has openings 81, whereby the space enclosed between said member and the nipple is connected with the inner cavity of stem 73. A spring 82 tends permanently to press sliding member 79, 80 to its lower position. The housing 51 is provided with similar members and, as shown by Fig. 2, the two shock absorbers are furthermore interconnected crosswise by ducts 83, 84. When violent shocks occur, the liquid contained under the pistons 63, 64 may pass, through springloaded valves 85, 86, into by-passes 87, 88 and flow into the space above said pistons.

If the chassis should be subjected to the effect of a force, centrifugal force for example, likely to cause the body to tilt towards the right, lever 57 begins to descend and lever 58 begins to rise. The right-hand piston of housing 51 therefore descends and exerts, upon the oil escaping under restraint, a pressure which extends, through duct 84, to a point below sliding member 79, 80, which raises said member and causes it to close the openings 75. Said openings may of course be obstructed to any desired extent preferably by leaving more or less play between sliding member 79 and the inner face of hollow stem 75. Overhang of the body of the vehicle towards the right is thereby vigorously braked or is even made impossible. As soon as the tendency of the left hand side to rise ceases and the pressure in the right hand cylinder of the left hand shock absorber is consequently discontinued, the sliding member is withdrawn by the spring 82 and the openings 75 are again opened. When the chassis rises and falls in movements parallel with itself, the shock absorbers retain their free, normal action.

Oil pressure may, of course, be used in various ways for the object stated, to increase, for example, the resistance furnished against the escaping oil by a throttling member contained in a by-pass (such as safety valves 85, 86) or to actuate valves, cocks or sliding members in a distributor box common to both shock absorbers. The device shown by Figs. 2 and 3 is very simple and is immediately adaptable to known shock absorbers.

Restricted braking as well as free braking can be regulated at will, because of the fact that the hollow stem 73 may be replaced by another having a different inner diameter or having larger, smaller or otherwise arranged openings 75 and that the sliding member 79, 80 may also be exchanged.

Fig. 4 shows how, according to the variable liquid pressure obtaining within cylinder 62, (Fig. 3) the closing power of valve 86 may be increased and thereafter lowered. To this end, a piston 91 is mounted parallel with slide 79, by means of passages 89, 90. The piston 91 contains a spring 92 bearing against the end of stem 93 of valve 86, which is normally kept closed by the spring 94 so that, when the pressure of the liquid contained in cylinder 62 exceeds a certain limit (12 atmospheres, for example), said valve opens and allows the liquid to flow through the by-pass 88 into the space, devoid of pressure, at the other side of the piston. If an increase of pressure in duct 84 then causes slide 79 to rise and the discharge orifices of openings 75 are wholly or partly throttled thereby, then piston 91 will be moved likewise and the pressure of the spring 92 against the stem 93 will increase, so that valve 86 will only open when a maximum pressure (24 to 32 atmospheres, for example) is exceeded in cylinder 62.

What I claim is:

1. A hydraulic shock absorber comprising a chamber to contain liquid, a cylinder within said chamber, a piston reciprocal within said cylinder, the chamber and the piston being adapted for connection, one to the chassis and the other to the running gear of a vehicle, so that relative vertical movements of the chassis and running gear reciprocate the piston, means providing a duct communicating with the chamber, said means having a port providing communication between the duct and the cylinder, a member movable within the duct to vary the effective area of said port, and means whereby relative sidewise tilting movements of the chassis and the running gear of a vehicle on which the shock absorber may be mounted produce movement of said member.

2. A set of two hydraulic shock absorbers each comprising a chamber to contain liquid, a cylinder within said chamber, a piston reciprocal within said cylinder, the chamber and the piston being adapted for connection, one to the chassis and the other to the running gear of a vehicle, so that relative vertical movements of the chassis and running gear reciprocate the piston, means providing a duct communicating with the chamber and the cylinder, and means whereby relative sidewise tilting movements of the chassis and the running gear of a vehicle on which the shock absorber may be mounted are effective to throttle the flow of liquid through said duct under the influence of movement of the piston within the other cylinder.

3. A hydraulic shock absorber comprising a chamber to contain liquid, a cylinder within said chamber, a piston reciprocal within said cylinder, the chamber and the piston being adapted for connection, one to the chassis and the other to the running gear of a vehicle, so that relative vertical movements of the chassis and running gear reciprocate the piston, means providing a duct communicating with the chamber, said means having a port providing communication between the duct and the cylinder, a member slidable within the duct to vary the effective area of said port, spring means for sliding said member in a direction to uncover said port, and means whereby relative sidewise tilting movements of the chassis and the running gear of a vehicle on which the shock absorber may be mounted produce sliding movement of said member in a direction to cover said port.

4. A hydraulic shock absorber comprising a chamber to contain liquid, a cylinder within said chamber, a piston reciprocal within said cylinder, the chamber and the piston being adapted for connection, one to the chassis and the other to the running gear of a vehicle, so that relative vertical movements of the chassis and running gear reciprocate the piston, means providing a duct communicating with the chamber and the cylinder, a member movable to throttle the flow of liquid through said duct, spring means to move said member in a direction to permit maximum flow of liquid through said duct, and means whereby relative sidewise tilting movements between the chassis and the running gear of a vehicle on which the shock absorber may be mounted produce movement of said member in a direction to restrict the flow of liquid through said duct.

5. A set of two hydraulic shock absorbers each comprising a chamber to contain liquid, a pair of cylinders within said chamber, a piston reciprocal within each cylinder, the chamber being adapted for connection with the chassis of a vehicle, means for connecting the pistons to the running gear of the vehicle so that the pistons of each set are movable in opposite directions in response to relative vertical movements between the chassis and the running gear, means providing a passageway communicating with the chamber and one of the cylinders of each set, means providing a duct communicating with the chamber and the other cylinder of each set, a member movable to throttle the flow of liquid through said duct, and means establishing communication between the said member of either set with the one cylinder of the other set whereby movement of the one piston of either set in one direction within the cylinder actuates said member to throttle the flow of liquid through said duct of the other set.

KLAAS LANDEWEER.